United States Patent [19]
Berthold et al.

[11] Patent Number: 5,591,976
[45] Date of Patent: Jan. 7, 1997

[54] GAMMA CAMERA SYSTEM FOR IMAGING CONTAMINATION

[75] Inventors: John W. Berthold, Salem; J. Jeffrey Kidwell; Douglas A. Norton, both of Alliance; Stuart E. Reed, Homeworth, all of Ohio

[73] Assignee: The Babcock & Wilcox Company, New Orleans, La.

[21] Appl. No.: 312,250

[22] Filed: Sep. 26, 1994

[51] Int. Cl.$^6$ ................................. G01T 1/169
[52] U.S. Cl. .................... 250/363.1; 250/366; 250/367
[58] Field of Search ................ 250/363.06, 363.1, 250/370.11, 366, 367; 378/149

[56] References Cited

U.S. PATENT DOCUMENTS

| | | | |
|---|---|---|---|
| 3,749,911 | 7/1973 | Hoover et al. | 250/363.06 |
| 3,936,639 | 2/1976 | Barrett | 250/366 |
| 4,465,540 | 8/1984 | Albert | 378/149 |
| 4,672,207 | 7/1987 | Derenzo | 250/370.11 |

FOREIGN PATENT DOCUMENTS

| | | | |
|---|---|---|---|
| 214288 | 10/1985 | Japan | 250/363.1 |

OTHER PUBLICATIONS

"A Nuclear Survey Instrument with Capability", Redus, Nagarkar, Cirignano, McGann & Squillante, *IEEE Transactions on Nuclear Science*, vol. 39, No. 4, 1992.
"Images obtained with a compact gamma camera", Bird & Ramsden *Nuclear Instructions and Methods in Physics Research* A299 (1990) 480–483.

*Primary Examiner*—Carolyn E. Fields
*Attorney, Agent, or Firm*—Robert J. Edwards; Eric Marich

[57] ABSTRACT

A system for detecting and imaging gamma radiation emitted by a contaminated area includes a plurality of collimators spaced a distance apart from each other. The collimators have a plurality of holes therethrough and the holes of one collimator are aligned with the holes in another collimator for forming a plurality of hole alignments which permit gamma rays to pass through the collimators. A scintillator and operatively connected avalanche photodiode are provided with each aligned hole of the collimators for determining the position of the gamma ray which passes through the collimators. A video camera records a visual image of the contaminated area and a monitor displays the video image along with location and size information provided by the avalanche photodiodes.

16 Claims, 5 Drawing Sheets

GAMMA CAMERA SYSTEM FOR IMAGING CONTAMINATION

FIELD AND BACKGROUND OF THE INVENTION

The present invention relates, in general, to radiation detection and, in particular, to a new and useful system for detecting and imaging low levels of gamma radiation.

In the radiation detection field, gamma imaging cameras have been utilized using both single-hole and multiple-hole collimators having a position-sensitive single detector. Several known gamma radiation detectors are disclosed in Redus et al., "A Nuclear Survey Instrument With Imaging Capability", IEEE Transactions on Nuclear Science, Vol. 39, No. 4, 1992; and Bird et al., "Images Obtained With A Compact Gamma Camera", Nuclear Instruments and Methods in Physics Research A299 (1990), p. 480–83.

It has been established that sensitivity to low gamma flux and spatial resolution of high radiation areas within the field of view is limited with these existing designs. Thus, it is known in this field that improved designs are needed which can detect low levels of gamma radiation and pinpoint the source of the radiation within the camera field of view.

Since refracting or reflecting materials are not available to focus short-wavelength gamma radiation, imaging must be performed by limiting the field of view of the detector. This is achieved by employing a lead piece having a hole therethrough known as a collimator. The detector is located at one end of the hole and observes only those gamma rays which pass through the hole. Gamma rays passing into the lead are absorbed.

One problem encountered when using a lead piece collimator having a single hole is that only a small area in the object field can be imaged at any given time. In order to speed up the inspection time for large areas, it is desirable to maximize the viewed area. One way this is achieved is to put multiple holes through the lead. However, until recently, large area detectors with spatial resolution have not been available. A single-large-area detector looking at all the holes in the lead is not able to discriminate or pinpoint which hole(s) the gamma rays had passed through.

One recent development in this field is to use position-sensitive photomultiplier tubes and charge-coupled device (CCD) arrays for gamma detection by placing a scintillator plate between the collimator and the detector. This method has proved effective for imaging regions in the object area with high gamma flux where the scintillator plate is thin. However, in order to detect low gamma flux, thicker scintillators are needed which increase the stand-off distance between the collimator and the detector. The effect of increasing stand-off distance is to increase the effective area (blur circle) seen by each spatial region of the detector, which degrades the spatial resolution of the system in the object area.

SUMMARY OF THE INVENTION

The purpose of the present invention is to solve the above-listed problems associated with the known radiation detection systems by using separate detectors and separate thick scintillators in a corresponding one-on-one relationship, i.e. one for each hole in the collimator. Accordingly, good spatial resolution is maintained along with good sensitivity to low level gamma flux.

Accordingly, one aspect of the present invention is drawn to a two-dimensional gamma radiation imaging system particularly suited for nuclear waste site clean-up operations which require radiation surveys in order to inspect walls and floors for radioactive contamination. The system is remotely operated to perform a radiation survey inside buildings to determine which areas are safe or unsafe for human entry. The gamma imaging system according to the present invention enables surfaces contaminated with radioactive gamma emitters to be viewed on a TV monitor so that the location and size of the contaminated region can be identified.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
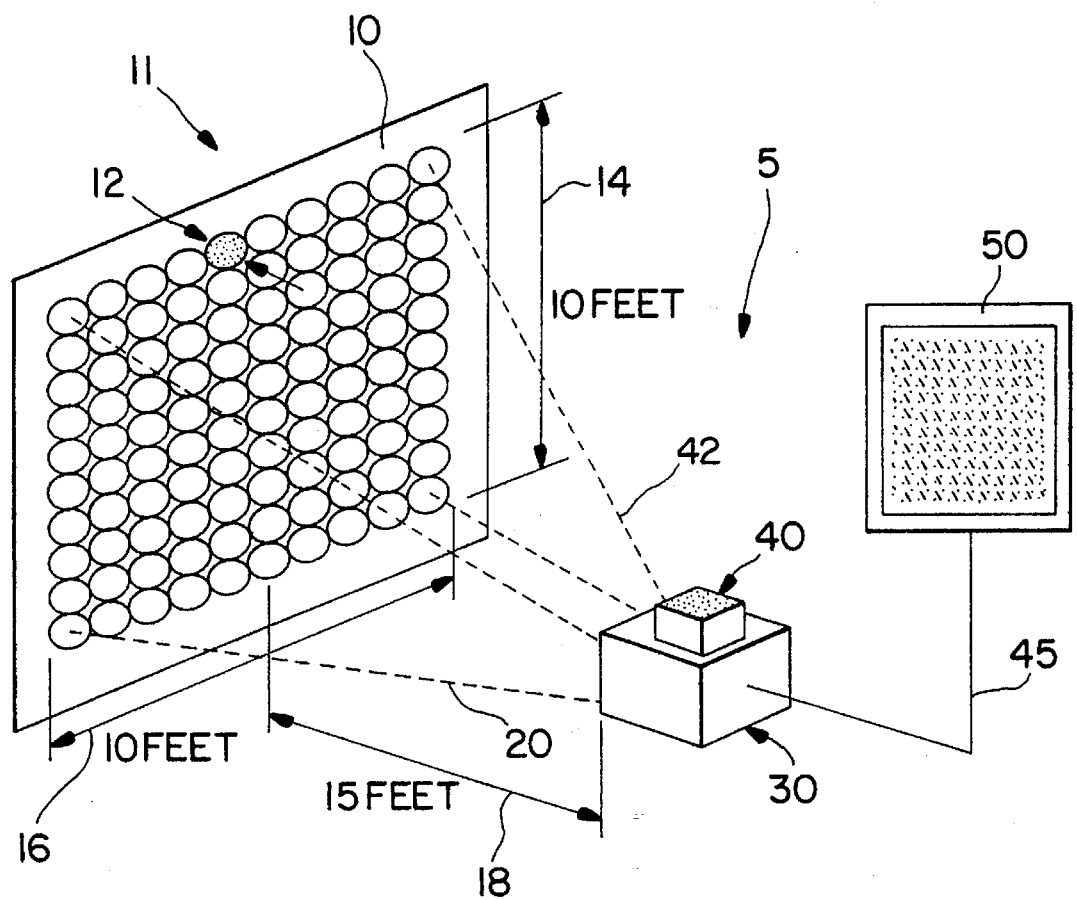
FIG. 1 is a schematic view illustrating a gamma radiation detection and imaging system according to the present invention.

Referring to FIG. 1, one aspect of the present invention is drawn to a gamma radiation detection and imaging system, generally designated 5, for detecting a contaminated area 11 which emits gamma radiation 20. The system 5 comprises a gamma camera 30 for scanning and detecting the position and location of gamma radiation 20 and a solid state video camera 40 located at the gamma camera 30 which provides a video image utilizing video projection signal 42. For illustration purposes, a wall 10 having a height 14 and a width 16 both of approximately 3000 mm (10 feet) dimensions contains the contaminated area 11. The gamma camera 30 is located a stand-off distance 18 away from the contaminated area 11; distance 18 ranges from approximately 1500 mm to 7600 mm (approximately 5 to 25 feet), and is preferably approximately 4500 mm (approximately 15 feet). The gamma camera 30 has the ability to view the contaminated area 11 in area increments 12 which are approximately 300 mm (approximately 12 inches) in diameter. Size and location information of the gamma radiation 20 as well as video signal 42 are transmitted to television monitor 50 which is operatively connected to the video camera 40 and the gamma camera 30 by signal conveying means schematically indicated by reference numeral 45. Monitor 50, located at the safe distance away from the contaminated area 11, displays the video image produced by video camera 40 along with an overlay of measured contamination levels provided by the gamma camera 30, for viewing by an operator.

Figure 2:
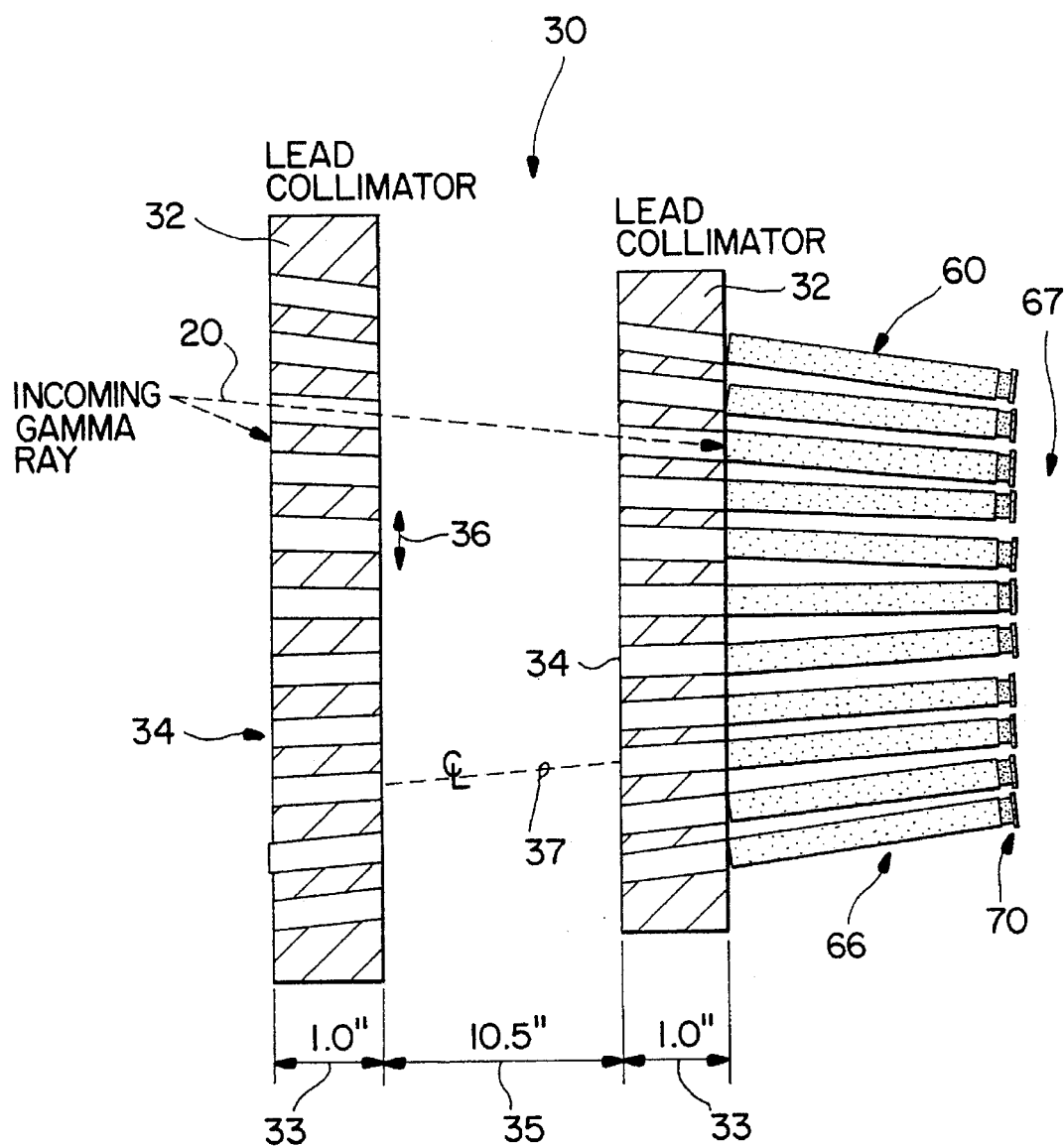
FIG. 2 is a schematic view illustrating the gamma camera of FIG. 1.

As shown in FIG. 2, the gamma camera 30 comprises a plurality of lead collimators 32, preferably two, having a plurality of holes 34 therethrough. The holes 34 have a diameter ranging from 0.2 to 0.8 inches which is indicated by reference numeral 36. The collimators 32 are spaced a distance apart from each other which ranges from approximately 1 to approximately 18 inches, and preferably at a distance of 10.5 inches as indicated at reference numeral 35. Collimators 32 each preferably have a thickness 33 of approximately one inch and are aligned such that the holes 34 of one collimator 32 are substantially axially aligned with the holes 34 of another collimator 32 as illustrated at 37. Accordingly, an incoming gamma ray 20 originating from one side of the collimators 32 is permitted to pass through aligned holes 34 therein to an array 66 of NaI or CsI scintillators 60 located at the other side of the collimators 32 at the aligned holes 34. The NaI or CsI scintillator crystals 60 are coated with a highly reflective material. Individual elements in an array 67 of avalanche photodiodes 70 having internal electronics are positioned at each scintillator 60 for converting the scintillation of each scintillator 60 into an informational signal for monitor 50 (FIG. 1). Each scintillator 60 has a length 62 which can be any size, but which is preferably approximately 3 inches (76.2 mm). The scintillators 60 in the array 66 can be various diameters; however, each has a preferable diameter 64 of approximately 10 mm or 0.39 inches as shown in FIG. 3.

The analysis behind the particular functional features of the present invention and their resulting operational performance in the context of a preferred embodiment of the invention is discussed below.

Figure 3:
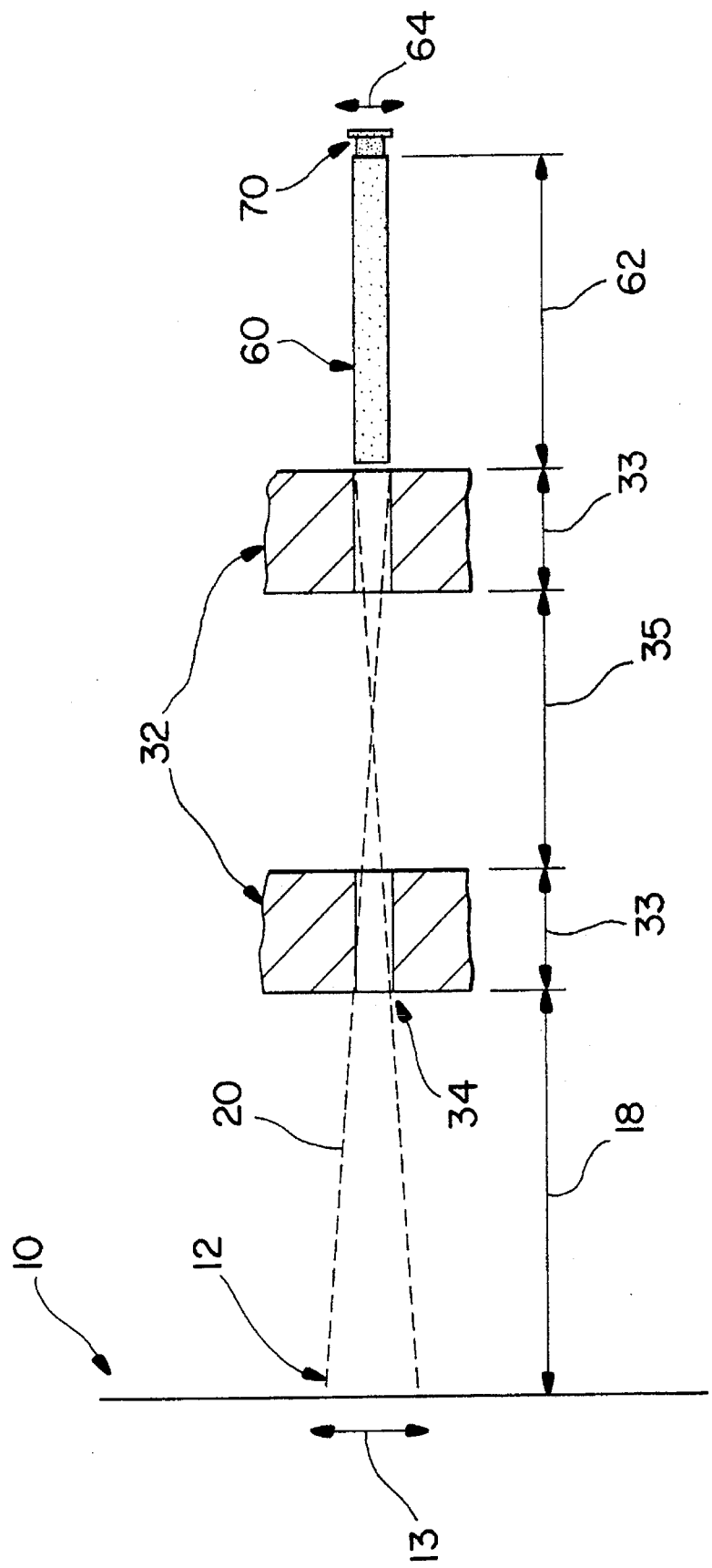
FIG. 3 is a detail view illustrating a section of FIG. 2 showing the clear aperture and limits on the gamma ray field-of-view.

Within the 15-foot stand-off distance 18, we can define the minimum resolvable spot 12 on the wall 10 to be a one-foot, i.e. 12 inch, diameter (730 cm$^2$) area indicated at 13 (FIG. 3). This means the camera system 5 will have to produce 100 pixels (resolution elements in the camera image plane) in order to image a 10 foot×10 foot wall area. It has been assumed for the purpose of calculation and estimation that a mixture of radionuclides is uniformly distributed over the 730 cm$^2$ resolution element on the wall 10, and that the contamination level is 15,000 gamma per minute per 100 cm$^2$.

The diameter 13 of the minimum resolvable spot 12 on the wall 10 is 300 mm diameter (~1 foot). The separation between the wall 10 and camera image plane 30 is 4500 mm (~15 feet). Since the separation between the camera 30 and the wall 10 exceeds ten times the maximum dimension of the minimum resolvable spot 12, the 1-foot spots on the wall may be considered to be point sources.

Next, one must consider radiation transfer from the contaminated 300 mm diameter spot 12 on the wall 10 to one of the camera elements shown in FIG. 3. The element consists of a collimation hole 34 drilled through each of a pair of 25 mm thick lead plates 32, a 76 mm long NaI (Tl) scintillation crystal 60 which is silver coated, and a silicon avalanche photodiode (APD) detector 70. Gamma rays 20 emitted from the wall 10 pass through the holes 34 in each of the lead collimators 32 to the scintillator 60, where the gamma energy 20 is converted to visible light (415 nm wavelength). The light is reflected at the coated surface of the crystal and funneled via multiple reflections to the APD 70 which converts the photo pulse to an electrical pulse.

For illustration purposes, we assume that the 300 mm diameter spot 12 on the wall 10 is uniformly covered by a radionuclide mixture that is emitting a maximum acceptable gamma radiation level of 15,000 gamma per minute per 100 cm$^2$. To estimate the number of light photons delivered to the APD detector 70, the gamma 20 emitted per second per mm$^2$ (G) from the 300 mm diameter spot 12 is given by:

$$G = (15000 \, \gamma/min/100 \, cm^2) \, (100 \, mm^2/cm^2)^{-1} (60 s/min)^{-1}$$

$$G = 0.025 \, \gamma/s/mm^2 \quad (1)$$

The quantity G is associated with some average power $P_E$ emitted by the spot 12 where the units of $P_E$ are in watts (Joules/s). Then using the well-known radiometric relationship, the power $P_R$ received at a distance r from the source is given by:

$$P_R = \frac{A_E A_R}{4\pi r^2} P_E \quad (2)$$

where:

$A_E$ = area of source $A_R$ = area of receiver

The factor $4\pi$ accounts for the fact that the power is emitted over a $4\pi$ steradian solid angle, thus the amount of received power is proportional to the area of the receiver relative to the surface area of a sphere, where the radius of the sphere corresponds to the distance between the source and receiver. The area of the source is $A_E = \pi (150 \, mm)^2$ and the area of the receiver is $A_R = \pi (5 \, mm)^2$ where the receiver is defined as the 10 mm diameter aperture of the NaI (Tl) scintillator 60. The separation r between this aperture and the source is about 4350 mm.

The gamma emissions per second collected at the receiver are determined using Equation (2) as follows:

$$\begin{aligned} G_R &= \frac{A_E A_R}{4\pi r^2} G_E \\ &= \frac{\pi(150)^2 \pi(5)^2}{4\pi(4530)^2} (0.025 \gamma/s/mm^2) \\ &= 5.8 \times 10^{-4} \gamma/s \end{aligned} \quad (3)$$

Note from Equation (3) that although the gamma collection rate is low, the rate would be 100 times larger if the contamination on the wall 10 was 7000 pCi/cm$^2$ instead of 70 pCi/cm$^2$. Also note that the gamma collection rate would be 100 times larger if the gamma camera 30 was 1.5 feet from the wall instead of 15 feet from the wall. It is realistic to assume that a full wall scan could be performed at a 15-foot stand-off to look for hot spots in the 7000 pCi/cm$^2$ range. After subsequent wall cleaning, a detailed wall scan could be performed at a 1.5 foot stand-off to verify radiation levels below the acceptable limit.

Now consider the efficiency of scintillator 60 assuming scintillator 60 is NaI (Tl). Once a gamma ray 20 enters the scintillator 60, it is converted to visible photons (415 nm wavelength) in the NaI (Tl) crystal. As long as the scintillator 60 has a sufficient length, the gamma radiation 20 in the energy range 100 kev to 1000 kev will be absorbed and produce photons. To estimate the scintillator lengths required, the Beer's law relationship is used to estimate the fraction of transmitted gamma radiation:

$$I/I_o = e^{(-a\rho x)} \quad (4)$$

where:

I = transmitted gamma intensity $I_o$ = incident gamma intensity a = mass attenuation coefficient for NaI $\rho$ = density of NaI (use 3.67 g/cm$^3$)

x = interaction length of gamma photon with scintillator.

Mass attenuation coefficients for NaI are known. Calculated values for $I/I_o$ for different gamma energies, mass attenuation coefficients, and interaction lengths are provided in Table 1 below.

TABLE 1

Calculated Gamma Transmission for Different Energies Mass Attenuation, and Path Lengths

| $I/I_o$ | $\gamma$ (kev) | a (cm²/g) | x (cm) |
|---|---|---|---|
| $3 \times 10^{-5}$ | 186 | 0.37 | 7.62 |
| 0.039 | 400 | 0.116 | 7.62 |
| 0.072 | 500 | 0.094 | 7.62 |
| 0.198 | 1000 | 0.058 | 7.62 |

Note that the attenuation $(1-I/I_o)$ of even the highest energy 1000 kev gamma is ~0.8. Energies below 500 kev are effectively absorbed.

Gamma radiation 20 absorbed in the scintillator 60 is converted to 3 ev (415 nm wavelength) photons with 12% efficiency. A 186 kev gamma ray will produce $n_1$ photons given by:

$$n_1 = (186,000 \text{ ev}/\gamma)(0.12)/(3 \text{ ev/photon}) = 7440 \text{ photons}/\gamma \quad (5)$$

At higher energies, proportionally more photons are produced.

Now, consider the silver coated NaI (Tl) scintillator crystal 60 shown in FIGS. 2 and 3. Visible 415 nm light produced by the gamma ray 20 is radiated over $4\pi$ steradians. The scintillator 60 is intended to capture as much of this visible light as possible. The scintillator 60 is silver coated (~0.025 mm thickness) except for the 1.5 mm aperture where visible light exits to the APD detector 70. The silver coating on the 10 mm aperture causes negligible attenuation of gamma. This coating provides a reflective surface for visible light that propagates within the $2\pi$ steradian solid angle viewed by the 1.5 mm detector aperture. The silver coating around the circumference of the cylindrical scintillator 60 has a reflectivity R=0.87 at 415 nm. We allow for an average of 10 reflections before the light exits the 1.5 mm aperture. High angle rays will experience more reflections, low angle rays, fewer reflections. With R=0.87, the light transmission T after 10 reflections is $(0.87)^{10}=0.25$.

The light collection efficiency E of the scintillator is given by:

$$E = \frac{a_{out}}{a_{in}} (3\pi) T \quad (6)$$

where:

$a_{out}$=area of output aperture $a_{in}$=area of input aperture $3\pi$=internal solid angle of emitted light collected The value of $3\pi$ is used in Equation (6) rather than $4\pi$ because the coated scintillator will not be a perfect light collector (i.e., the steep angle rays will be absorbed after multiple reflections >>10).

Calculating, we obtain:

$$E = \frac{\pi (0.75 \text{ mm})^2}{\pi (5 \text{ mm})^2} (3\pi)(0.25) \quad (7)$$
$$= 0.056$$

The number of light photons $n_2$ that exit the 1.5 mm aperture is obtained from Equations (3), (5), and (7).

$$n_2 = G n_1 E$$

$$n_2 = (5.8 \times 10^{-4} \gamma/s)(7440 \text{ photons}/\gamma)(0.056) \quad (8)$$

$n_2$=0.24 photons/sec.

In order to see 1 photon, one must thus wait approximately 4 seconds. To ensure that these photons are efficiently coupled to the APD detector 70, the scintillator 60 must contact the active area of the APD 70. This is because light exits the 1.5 mm aperture in a $2\pi$ steradian solid angle. Even a small separation between the NaI and Si detector 60 would cause rays to miss the detector 70. Furthermore, the high refractive indices of both silicon (n~4) and NaI (n~1.85) would add additional surface reflection losses if the two materials are not in contact.

For 3 ev photons, the average power $P_{AV}$ is given by:

$$P_{AV} = (0.24 \text{ photon/s})(3 \text{ ev/photon})(1.6 \times 10^{-19} \text{ J/ev})$$

$$P_{AV} = 1.1 \times 10^{-19} \text{ watts} \quad (9)$$

The gamma rays 20 produce 230 ns bursts of 3 ev photons with peak power $P_p$ per burst of:

$$P_p = \frac{1.1 \times 10^{-19}}{2.3 \times 10^{-7}} = 4.8 \times 10^{-13} \text{ watts} \quad (10)$$

To see pulses with $\Delta t = 2.3 \times 10^{-7}$ s pulse width, the APD bandwidth B must be $$B = [2\pi RC]^{-1} \quad (11)$$

The time constant RC is the time needed for the APD output voltage to reach 90% of its final value $$RC = -\Delta t / \ln(1 - 0.9) \quad (12)$$

$$B = [(2\pi)(1.0 \times 10^{-7})]^{-1} \quad (13)$$

$$= 1.6 \times 10^6 \text{ Hz}$$

Therefore, the required noise equivalent power (NEP) for the APD 70 is:

$$NEP = P_p B^{-1/2} \quad (14)$$
$$= 4.8 \times 10^{-13} \text{ W} (1.6 \times 10^6 \text{ Hz})^{-1/2}$$
$$= 3.8 \times 10^{-16} \text{ W}/\sqrt{\text{Hz}}$$

This NEP is close to the detection limit for presently available state-of-the-art APDs.

Equal in importance to NEP is the background count rate. With an APD thermoelectrically cooled to −25° C., a background dark noise count rate of 5 counts/minute (0.0833 counts/sec) is possible. Thus, if we count for an extended time t, the background dark count noise level N is $$N = Bt \quad (15)$$

where B is the dark noise count rate. The statistical error is given by $\sqrt{N}$.

If the wall is contaminated, additional counts at a rate C will be detected by the APD 70. Counting again for time t, the count rate will increase both photons and noise counts are recorded. The total count R includes the signal count S due to photons:

$$S = (1 \text{ count/photon})(C \text{ photons/second})(t) \quad (16)$$
$$= Ct \text{ counts}$$

plus noise counts N=Bt counts:

$$R = S + N \quad (17)$$
$$= (C + B)t \text{ counts}$$

The value of N may be determined independently at the test site by covering the collimator input with a lead shutter. Then the signal is:

$$S = R - N \text{ counts} \quad (18)$$

and the signal-to-noise ratio is calculated as:

$$S/N = (R-N)/N = C/B \quad (19)$$

As long as R–N exceeds the statistical counting error √N, a measurable signal will always result. Therefore, if one counts long enough, one can determine from 15 feet away what the radiation levels are on the wall 10.

Figure 4:
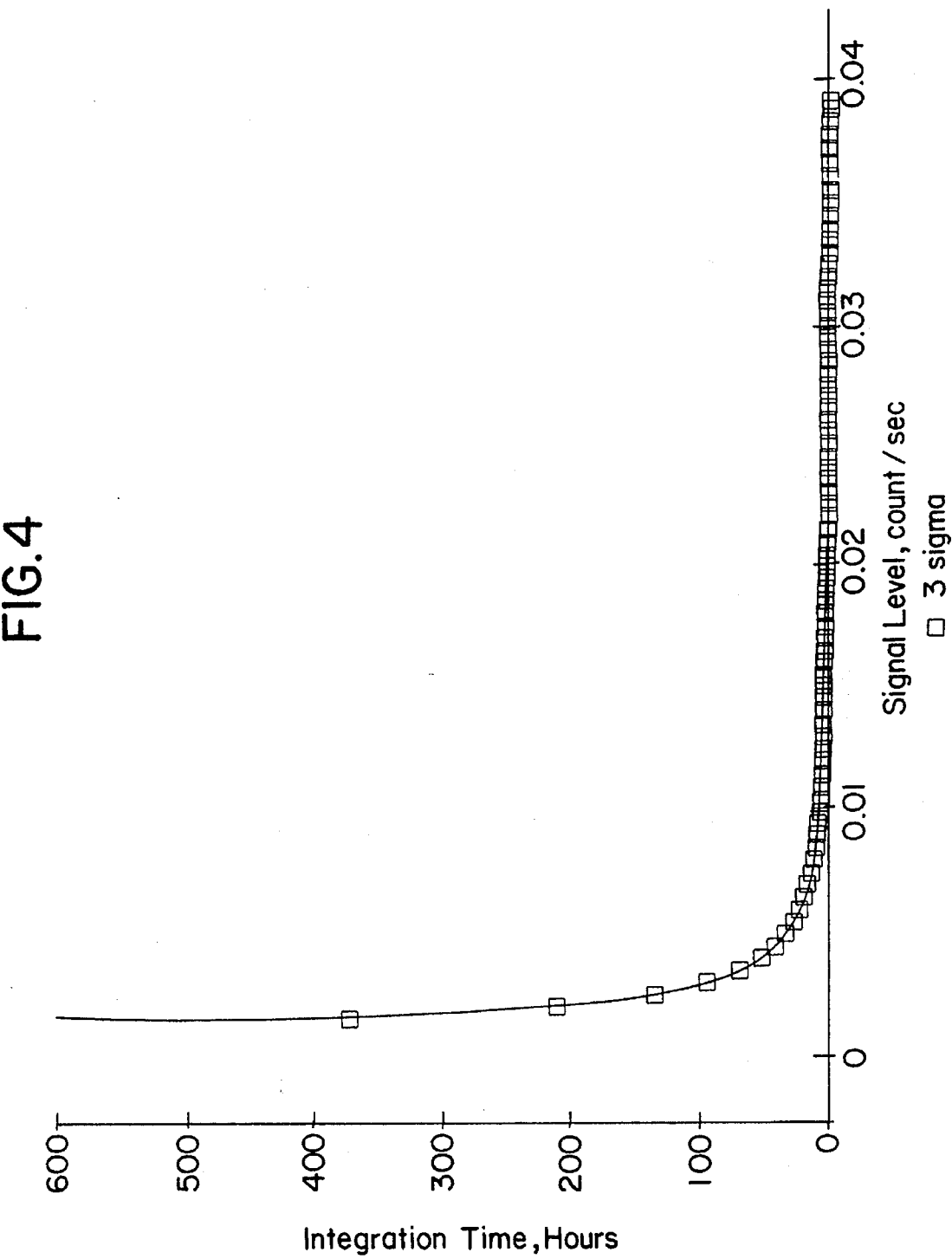
FIG. 4 is a graph plotting minimum integration time versus signal level for the present invention.
Figure 5:
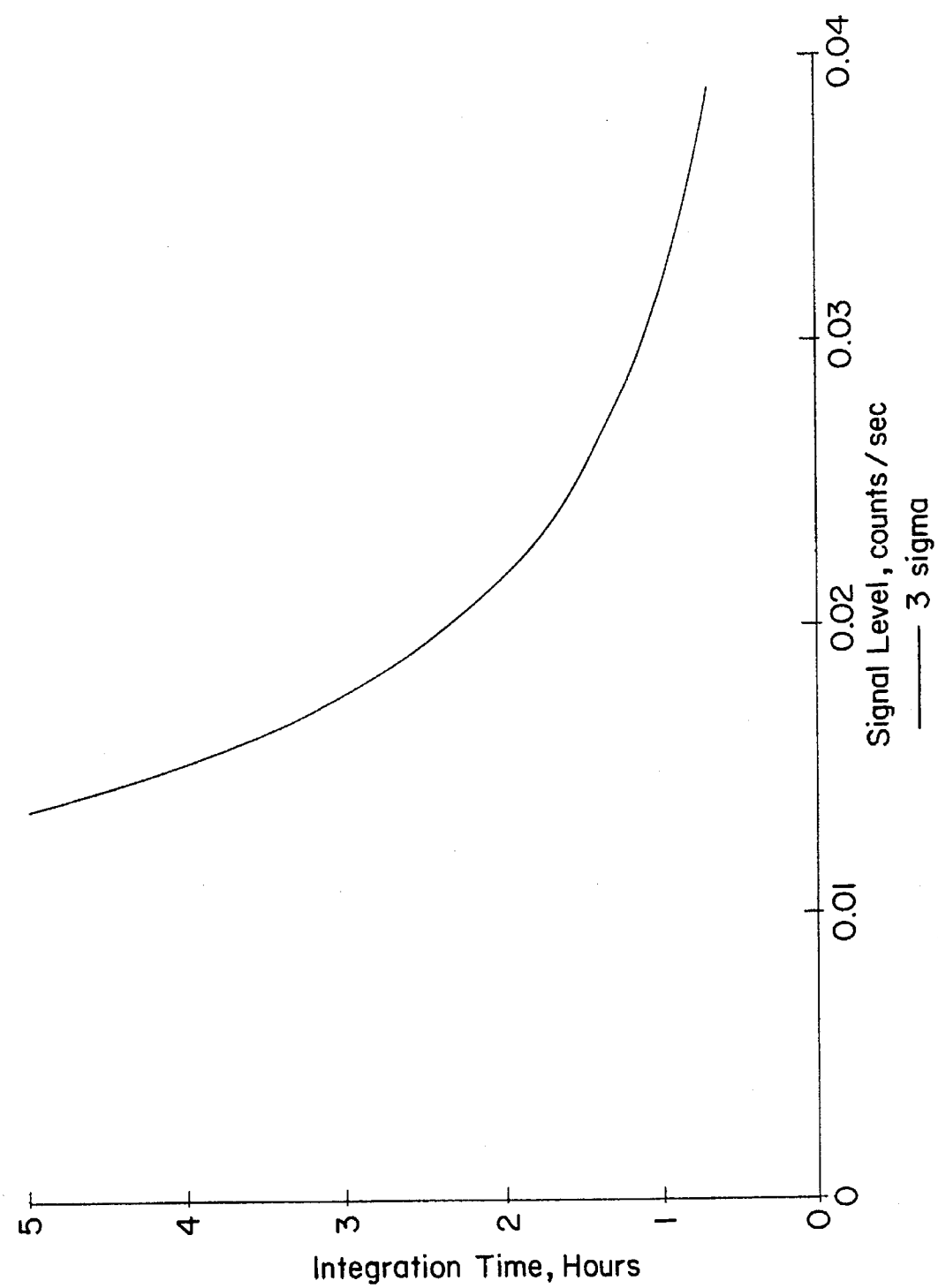
FIG. 5 is a second graph plotting minimum integration time versus signal level for the present invention.

If one counts for an extended period of time, one can detect gamma radiation from a hot spot 12 on the wall 10 by integrating the signal counts plus dark counts. The amount of time needed to detect a signal above the background depends on the signal count rate and background count rate (Equation 19). For a background count rate of 5 counts/minute, the integration time versus signal level is shown in FIGS. 4 and 5. The 3 sigma statistical limit means that the hot spot can be identified with 99% confidence.

The signal count rate is tabulated in Table 2 below so that integration time (count time) can be determined for two different values of background count rate. Note that $7 \times 10^{-11}$ Ci/cm$^2$ corresponds to the maximum allowed radiation level for an acceptably clean surface. The calculations are based on a 15 foot stand-off of the gamma camera 30 from this surface. At a background count rate of 70 cps it would take $2.8 \times 10^6$ hours (about 320 yrs) to determine if the surface is acceptably clean. This, measurement time drops to $3.3 \times 10^3$ hours (about 4.5 months) if the background count rate is 5 counts/minute (0.0833 cps). Such low background count rates can be achieved by surrounding the gamma camera 30 with a low-activity radiation shield. From a practical standpoint, a detection limit of $5 \times 10^{-9}$ Ci/cm$^2$ is achievable in about 48 minutes at a background count rate of 5 counts/minute.

TABLE 2

3 sigma minimum count times

| Ci/cm$^2$ | Signal cps | Background count 70 cps | | Background count 0.083333 cps | | |
|---|---|---|---|---|---|---|
| | | Count Time, sec | Count Time, hrs | Count Time, sec | Count Time, hrs | |
| $7 \times 10^{-11}$ → | 0.0005 | 1.0E+10 | 2800010 | 12035968 | 3343.324 | Low level |
| | 0.0010 | 2.5E+09 | 700004.9 | 3017971. | 838.3255 | background |
| | 0.0015 | 1.1E+09 | 311114.4 | 1345306. | 373.6961 | |
| | 0.0020 | 6.3E+08 | 175002.4 | 758973.0 | 210.8258 | |
| | 0.0025 | 4.0E+08 | 112001.9 | 487173.2 | 135.3258 | |
| | 0.0030 | 2.8E+08 | 77779.44 | 339306.6 | 94.25185 | |
| | 0.0035 | 2.1E+08 | 57144.28 | 250014.2 | 69.44840 | |
| | 0.0040 | 1.6E+08 | 43751.24 | 191973.5 | 53.32598 | |
| | 0.0045 | 1.2E+08 | 34569.01 | 152121.7 | 42.25605 | |
| | 0.0050 | 1.0E+08 | 28000.99 | 123573.7 | 34.32603 | |
| | 0.0055 | 83309057 | 23141.40 | 102420.0 | 28.45002 | |
| | 0.0060 | 70002999 | 19445.27 | 86307.23 | 23.97423 | |
| | 0.0065 | 59647739 | 16568.81 | 73749.12 | 20.48586 | |
| | 0.0070 | 51431142 | 14286.42 | 63769.97 | 17.71388 | |
| | 0.0075 | 44802399 | 12445.11 | 55707.46 | 15.47429 | |
| | 0.0080 | 39377249 | 10938.12 | 49099.20 | 13.63866 | |
| | 0.0085 | 34881010 | 9689.169 | 43614.41 | 12.11511 | |
| | 0.0090 | 31113111 | 8642.530 | 39011.38 | 10.83649 | |
| | 0.0095 | 27924332 | 7756.758 | 35110.15 | 9.752821 | |
| | 0.0100 | 25201799 | 7000.499 | 31774.49 | 8.826248 | |
| | 0.0105 | 22858857 | 6349.682 | 28899.73 | 8.027704 | |
| | 0.0110 | 20828082 | 5785.578 | 26404.38 | 7.334552 | |
| | 0.0115 | 19056385 | 5293.440 | 24224.23 | 6.728954 | |
| | 0.0120 | 17501499 | 4861.527 | 22308.10 | 6.196697 | |
| | 0.0125 | 16129439 | 4480.399 | 20614.84 | 5.726345 | |
| | 0.0130 | 14912627 | 4142.396 | 19111.00 | 5.308613 | |
| | 0.0135 | 13828493 | 3841.248 | 17769.22 | 4.935894 | |
| | 0.0140 | 12858428 | 3571.785 | 16566.88 | 4.601912 | |
| | 0.0145 | 11986972 | 3329.714 | 15485.22 | 4.301450 | |
| | 0.0150 | 11201199 | 3111.444 | 14508.51 | 4.030143 | |
| | 0.0155 | 10490235 | 2913.954 | 13623.53 | 3.784314 | |
| | 0.0160 | 9844874. | 2734.687 | 12819.06 | 3.560850 | |
| | 0.0165 | 9257289. | 2571.469 | 12085.57 | 3.357102 | |
| | 0.0170 | 8720781. | 2422.439 | 11414.88 | 3.170802 | |
| | 0.0175 | 8229599. | 2285.999 | 10799.99 | 2.999998 | |
| | 0.0180 | 7778777. | 2160.771 | 10234.82 | 2.843008 | |
| | 0.0185 | 7364011. | 2045.558 | 9714.128 | 2.698368 | |
| | 0.0190 | 6981556. | 1939.321 | 9233.313 | 2.564809 | |
| | 0.0195 | 6628141. | 1841.150 | 8788.381 | 2.441217 | |
| | 0.0200 | 6300899. | 1750.249 | 8375.820 | 2.326616 | |
| | 0.0205 | 5997308. | 1665.919 | 7992.538 | 2.220149 | |
| | 0.0210 | 5715142. | 1587.539 | 7635.806 | 2.121057 | |
| | 0.0215 | 5452432. | 1514.564 | 7303.207 | 2.028668 | |
| | 0.0220 | 5207429. | 1446.508 | 6992.593 | 1.942387 | |
| | 0.0225 | 4978577. | 1382.938 | 6702.050 | 1.861680 | |
| | 0.0230 | 4764487. | 1323.468 | 6429.870 | 1.786075 | |
| | 0.0235 | 4563916. | 1267.754 | 6174.523 | 1.715145 | |
| Ci/cm$^2$ | 0.0240 | 4375749. | 1215.486 | 5934.635 | 1.648509 | |

TABLE 2-continued

| | | 3 sigma minimum count times | | | |
|---|---|---|---|---|---|
| | | Background count 70 cps | | Background count 0.083333 cps | |
| Ci/cm² | Signal cps | Count Time, sec | Count Time, hrs | Count Time, sec | Count Time, hrs |
| | 0.0245 | 4198985. | 1166.384 | 5708.972 | 1.585825 |
| | 0.0250 | 4032719. | 1120.199 | 5496.419 | 1.526783 |
| | 0.0255 | 3876138. | 1076.705 | 5295.969 | 1.471102 |
| | 0.0260 | 3728502. | 1035.695 | 5106.712 | 1.418531 |
| | 0.0265 | 3589144. | 996.9846 | 4927.819 | 1.368838 |
| | 0.0270 | 3457456. | 960.4046 | 4758.541 | 1.321817 |
| | 0.0275 | 3332885. | 925.8016 | 4598.192 | 1.277275 |
| | 0.0280 | 3214928. | 893.0357 | 4446.148 | 1.235041 |
| | 0.0285 | 3103124. | 861.9790 | 4301.840 | 1.194955 |
| | 0.0290 | 2997053. | 832.5148 | 4164.744 | 1.156873 |
| | 0.0295 | 2896329. | 804.5360 | 4034.382 | 1.120661 |
| | 0.0300 | 2800599. | 777.9444 | 3910.315 | 1.086198 |
| | 0.0305 | 2709539. | 752.6498 | 3792.140 | 1.053372 |
| | 0.0310 | 2622849. | 728.5691 | 3679.484 | 1.022079 |
| | 0.0315 | 2540253. | 705.6260 | 3572.005 | 0.992223 |
| | 0.0320 | 2461499. | 683.7499 | 3469.386 | 0.963718 |
| | 0.0325 | 2386352. | 662.8757 | 3371.335 | 0.936481 |
| | 0.0330 | 2314595. | 642.9430 | 3277.580 | 0.910439 |
| | 0.0335 | 2246026. | 623.8961 | 3187.872 | 0.885520 |
| | 0.0340 | 2180460. | 605.6833 | 3101.977 | 0.861660 |
| | 0.0345 | 2117723. | 588.2566 | 3019.680 | 0.838800 |
| $5 \times 10^{-9} \rightarrow$ | 0.0350 | 2057657. | 571.5714 | 2940.779 | 0.816883 Detection limit |
| | 0.0355 | 2000110. | 555.5861 | 2865.088 | 0.795857 |
| | 0.0360 | 1944944. | 540.2623 | 2792.431 | 0.775675 |
| | 0.0365 | 1892029. | 525.5638 | 2722.648 | 0.756291 |
| | 0.0370 | 1841246. | 511.4572 | 2655.585 | 0.737662 |
| | 0.0375 | 1792479. | 497.9111 | 2591.102 | 0.719750 |
| | 0.0380 | 1745626. | 484.8961 | 2529.065 | 0.702518 |
| | 0.0385 | 1700585. | 472.3848 | 2469.351 | 0.685931 |
| | 0.0390 | 1657266. | 460.3517 | 2411.843 | 0.669956 |

The present invention provides advantages which are not found in the known radiation detection systems. For instance, the two-section lead collimator of the present invention is used to reduce weight. Also, the present invention utilizes individual scintillators coupled to individual avalanche photodiode detectors to increase sensitivity to low gamma flux, to improve spatial resolution of radioactive areas, and to reduce overall camera size.

Several different single-detector choices are available for use with the gamma camera of the present invention. Choice of detectors is based on desired sensitivity to gamma flux, operating power requirements, and overall system cost, since multiple detectors are required for each system. Alternative detectors include silicon photodiodes, silicon avalanche photodiodes, vacuum avalanche photodiodes, miniature photomultiplier tubes, $HgI_2$ detectors, and CdTe detectors.

In addition, several choices are also available for the scintillator material. These include NaI and CsI. Choices for the scintillator are based on the expected energy range of radioisotopes to be detected and on the spectral response characteristics of the detectors. This consideration is generally specific to different applications. Thus, this ideal gamma camera design allows for easy change-out of scintillator material located between the collimator and detector.

With respect to the configuration illustrated in FIG. 3, changing the separation between the lead collimators (shown as 10.5") enables variation of the effective spot size in the object and image, which allows the resolution to be variable and allows variation in the stand-off distance between the object and the camera. The camera can be built with a motor drive to provide for remote control of the separation between the lead collimators.

While specific embodiments of the invention have been shown and described in detail to illustrate the application of the principles of the invention, it will be understood that the invention may be embodied otherwise without departing from such principles. Accordingly, while all such variations have been deleted herein for the sake of conciseness and readability, all fall within the scope and equivalents of the following claims.

We claim:

1. A system for detecting and imaging gamma radiation emitted by a contaminated area located a distance ranging from approximately 5 to approximately 25 feet away from the system, comprising:

two collimators spaced a distance apart from each other, the collimators having a plurality of holes therethrough having a diameter ranging from approximately 0.2 to approximately 0.8 inches, the holes of one collimator being aligned with the holes of the other collimator for forming a plurality of hole alignments, the hole alignments for passing a gamma ray through the collimators;

scintillator means, for each hole alignment, for scintillating in the presence of gamma rays and means for converting a scintillation at each scintillator means into an informational signal indicative thereof for identifying the position of the gamma rays passed through the hole alignments in the collimators; and visual imaging means for producing a visual image of the location and the size of the contaminated area using said informational signal.

2. The system according to claim 1, further comprising a photodiode array element for each scintillator means.

3. The system according to claim 1, further comprising a discrete photodiode for each scintillator means.

4. The system according to claim 1, wherein the visual imaging means comprises a video camera for imaging and recording the contaminated area.

5. The system according to claim 4, wherein the visual imaging means further comprises a video monitor operatively connected to the video camera and the gamma ray position identifying means for displaying the visual image of the location and the size of the contaminated area.

6. The system according to claim 1, wherein the scintillator means includes NaI.

7. The system according to claim 1, wherein the scintillator means includes pure NaI.

8. The system according to claim 1, wherein the scintillator means includes NaI and an amount of dopant.

9. The system according to claim 1, wherein the scintillator means includes CsI.

10. The system according to claim 1, wherein the scintillator means includes pure CsI.

11. The system according to claim 1, wherein the scintillator means includes CsI and an amount of dopant.

12. The system according to claim 1, wherein the collimators are made of lead.

13. The system according to claim 1, wherein the distance between the collimators ranges from approximately 1 to approximately 18 inches.

14. The system according to claim 1, wherein the distance between the collimators ranges from approximately 8 to approximately 12 inches.

15. The system according to claim 1, wherein the gamma ray position identifying means further comprises a photodiode array element for each scintillator means, the photodiode array elements being a member selected from the group consisting of silicon photodiodes, silicon avalanche photodiodes, and vacuum avalanche photodiodes.

16. The system according to claim 1, wherein the gamma ray position identifying means further comprises, for each scintillator means, one of a miniature photomultiplier tube, an $HgI_2$ detector, or a CdTe detector.

* * * * *